3,215,664
WHITE WATER REPELLENT
Murrel A. Brown, Midland, Mich., assignor to Dow Corning Corporation, Midland, Mich., a corporation of Michigan
No Drawing. Filed Mar. 1, 1962, Ser. No. 176,791
6 Claims. (Cl. 260—41)

This invention relates to a white water repellent composition and leather impregnated therewith.

In U.S. Patent No. 2,728,736 (Hunter et al.) and U.S. Patent No. Re. 23,879 (Currie) are disclosed water repellent materials which prevent or greatly retard the passage of water without preventing the passage of air. These water repellents when applied to foot wear, keep the feet dry from exterior moisture and at the same time allow the evaporation of perspiration. A method for incorporating a white pigment, such as $TiO_2$, in these water repellents has been desired for some time. It is essential that such a method impair neither the pigmenting properties of $TiO_2$ nor the properties of the water repellent. It is the primary object of this invention to find a method for incorporating $TiO_2$ with these water repellents so that the product imparts both a white color and water repellency to leather.

This invention relates to a composition of matter consisting essentially of (1) 100 parts by weight of a mixture of
  (A) 15 to 50 percent by weight, based upon the weight of (1), of a compound selected from the group consisting of compounds of the general Formula $M(OR)_4$ and aliphatic hydrocarbon soluble partial hydrolyzates thereof, in said compounds M being a titanium or a zirconium atom and R is selected from the group consisting of aliphatic hydrocarbon radicals of less than 13 carbon atoms and hydroxylated aliphatic hydrocarbon radicals of less than 13 carbon atoms and containing less than 4 hydroxyl groups,
  (B) 5 to 70 percent by weight, based upon the weight of (1), of a methylpolysiloxane copolymer composed essentially of trimethylsiloxane units and $SiO_2$ units, said units being in such proportion that the ratio of methyl radicals to silicon atoms is from 1:1 to 2.3:1, and
  (C) 15 to 80 percent by weight, based upon the weight of (1), of a polysiloxane having the general formula

  $$R'_n SiO_{\frac{4-n}{2}}$$

wherein R' is selected from the group consisting of alkyl and alkenyl radicals of less than 6 carbon atoms and monocyclic aryl radicals and $n$ has an average value of from 2 to 2.9 inclusive, each silicon atom in said polysiloxane (C) having at least one of the defined hydrocarbon radicals attached thereto,
(2) 15 to 60 parts by weight of a resin selected from the group consisting of alkyl methacrylate polymers in which the alkyl radical has from 1 to 18 inclusive carbon atoms, there being no more than 30 mol percent of alkyl radicals of less than 3 carbon atoms and alkyl acrylate polymers in which the alkyl radical has from 2 to 15 carbon atoms,
(3) 70 to 160 parts by weight $TiO_2$, there being from 2 to 4 parts of (3) per one part of (2).

The white water repellents of this invention can be prepared by merely mixing the water repellent (1), the resin (2) and the $TiO_2$ (3). The three components of the water repellent (1) can be mixed together prior to the addition of the resin and the titanium dioxide or alternatively all of the ingredients can be mixed together at the same time. Although the mixing can be accomplished with the undiluted materials, it is preferable to employ a common solvent. Suitable solvents include hydrocarbon solvents such as toluene, Stoddard solvent, naphtha mineral spirits, Varsol (a commercial solvent having an aliphatic content of about 84 percent and an aromatic content of about 16 percent) and the like; halogenated solvents, such as perchloroethylene, methylene chloride and the like. It is preferable to use sufficient solvent so that the impregnating solution contains from 25 to 50 percent solids. It is preferable that these compositions be mixed together with agitation and then run through a colloid mill.

Applicataion of these white water repellents to leather can be readily accomplished by brushing, daubing or dipping and can be applied to leather sheets or leather articles such as shoes, belts, etc. Although these compositions can be employed in the form of a solvent-paste which can contain polishing agents, it is preferable to use these compositions in the form of solvent solutions. Excellent results are obtained by impregnating the leather to the extent of 2 to 20 percent by weight of the white water repellent composition (based on the weight of the leather). Leather containing from 4 to 8 percent by weight of the white water repellent is preferred. As many applications of this composition to leather as is necessary to effect the desired degree of impregnation can be employed. Ordinarily, one application with a 25 to 40 percent solution is sufficient.

These white water repellents are composed of a water repellent (1), a resin (2) and titanium dioxide (3). The water repellent is composed of three parts. The water repellent contains from 5 to 70 percent by weight, based upon the weight of (1) of a methylpolysiloxane resinous copolymer (B), which is composed essentially of trimethylsiloxane units and $SiO_2$ units, but can contain traces of dimethylsiloxane units and/or monomethylsiloxane units. These copolymers can be prepared by co-hydrolyzing $(CH_3)_3SiX$ and $SiX_4$, where X is a hydrolyzable radical. Another method by which these materials can be prepared is by the reaction of methylchlorosilanes, methylalkoxysilanes or hexamethyldisiloxane with an acetic silica sol. Regardless of the method employed, the ratio of methyl radicals to silicon radicals in the copolymer must be from 1:1 to 2.3:1, with the preferred range being from 1:1 to 1.5:1.

The water repellent components also contains an organopolysiloxane (C) in which R' can be any alkyl or alkenyl radical of less than 6 carbon atoms or any monocyclic aryl radical. Specific examples of operative siloxanes are dimethylsiloxane, vinylmethylsiloxane, vinylallylsiloxane, dipropylsiloxane, methylxenylsiloxane or any mixture thereof. Also copolymers of these diorganosiloxanes with triorganosiloxanes such as trimethylsiloxane, phenyldimethylsiloxane, hexenyldiethylsiloxane and amyldimethylsiloxanes are operative. Monoorganosiloxane units can also be present in these siloxanes so long as the value of $n$ remains substantially in the range specified. It is preferred that $n$ have a value of from 2 to 2.2 inclusive. These organopolysiloxanes (C) are benzene soluble materials which can vary in viscosity from thin fluids to deformable solids. Generally, fluid copolymers having a viscosity ranging from 5 to 100,000 cs. at 25° C. are preferred. Dimethylsiloxanes within this range are the preferred materials. It is necessary that the water repellent (1) contain from 15 to 80 percent by weight, based upon the total weight of the water repellent, of these organopolysiloxanes (C).

The water repellent also contains from 15 to 50 percent by weight, based on the weight of the water repellent of (A) either a titanium or zirconium ester. These esters have the general formula $M(OR)_4$, wherein M is either a titanium atom or a zirconium atom and R is an aliphatic hydrocarbon radical of less than 13 carbon atoms or a hydroxylated aliphatic hydrocarbon radical of less than 13 carbon atoms and containing less than 4 hydroxy radicals. Thus, titanium esters, such as, tetramethyl titanate, tetraethyl titanate, tetradecyltitanate, octylene glycol titanate, tetra-2-ethylhexyl titanate, tetradodecyl titanate, tetraisopropyl titanate and mixtures thereof can be used. Titanium esters wherein all the R groups are the same or ester containing mixed R radicals are also suitable. Preferably, the R groups should have at least 3 carbon atoms. Partially hydrolyzed $Ti(OR)_4$ compounds can be employed if the hydrolysis has not rendered the compounds insoluble in aliphatic solvents (such as toluene). If partially hydrolyzed titanium compounds are employed, particular care is necessary to prevent undue formation of insoluble $TiO_2$. Tetra-2-ethylhexyl titanate is preferred. All of the titanium esters mentioned in the examples of this application are commercially available. The titanium compounds suitable for employment in the water repellent (1) are those disclosed in U.S. Patent No. Re. 23,879, which is hereby incorporated by reference.

Component (A) of the water repellent composition can also be a zirconium compound wherein the R group is as defined above. Specific examples of operative compounds are tetramethyl zirconate, tetraethyl zirconate, tetradecyl zirconate, octylene glycol zirconate, tetra-2-ethylhexyl zirconate, tetradodecyl zirconate, tetraisopropyl zirconate, tert-butyltrimethyl zirconate and mixtures of partial hydrolyzates thereof. Preferably, the R group should contain at least 3 carbon atoms. These compounds can be prepared by any of the methods well known in the art. The preferred compounds, are those in which R contains from 4 to 8 carbon atoms inclusive. Partial hydrolyzates of these zirconium compounds can also be used as long as they are soluble in aliphatic solvents. The zirconates suitable for this invention are disclosed in U.S. Patent No. 2,728,736, which is hereby incorporated by reference.

This white water repellent also contains from 15 to 60 parts of either an alkyl acrylate polymer or an alkyl methacrylate polymer. The alkyl radical in the acrylate polymer has from 2 to 15 inclusive carbon atoms. Examples of these alkyl radicals are ethyl, butyl, isobutyl, lauryl and pentadecyl. The resin (2) can also be an alkyl methacrylate polymer in which the alkyl radical has from 1 to 18 inclusive carbon atoms, with no more than 30 mol percent of the alkyl radical having less than 3 carbon atoms. Thus, stearyl methacrylate polymers can be employed. The methacrylate polymer can contain up to 30 mol percent of methyl and/or ethyl methacrylate. Preferably not more than 20 mol percent of these polymeric units are present in the copolymer. The methacrylate polymers are preferred with the best results being obtained with butyl methacrylate, isobutyl methacrylate, copolymers of butyl and isobutyl methacrylate and copolymers of butyl methacrylate and a small amount of methyl methacrylate. Methods of making these acrylate and methacrylate polymers are well known in the art. Both types of polymers can be represented by the unit formula

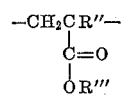

Most of the units in these polymers are linked together through

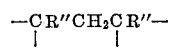

linkages. R″ in the acrylate polymers represent a hydrogen atom, and in the methacrylate polymers represent a $CH_3$ group. R‴ in the acrylate polymers represent an alkyl radical of from 2 to 15 inclusive carbon atoms. R‴ in the methacrylate polymer represents an alkyl radical of from 1 to 18 inclusive carbon atoms with no more than 30 mol percent of the alkyl radicals having less than 3 carbon atoms. It is preferable that the resin (2) be employed in an amount from 20 to 35 parts by weight per 100 parts of the water repellent (1).

This white water repellent also contains titanium dioxide in an amount from 70 to 160 parts by weight per 100 parts of water repellent composition (1). It is preferred that $TiO_2$ be present in an amount from 90 to 110 parts per 100 parts of (1). It is essential that there be from 2 to 4 parts of the titanium dioxide (3) per one part of the resin (2). It is thought that the resin (2) serves as a binder for the titanium dioxide, although the invention is not so limited. The above limitations on the amount of resin and titanium dioxide in relation to each other and in relation to the water repellent composition (1) are critical.

The compositions of this invention not only improve the water repellency but also impart a white color to any leather either tanned, tawed or otherwise cured or finished or unfinished leather. They are also applicable to leather from any type of animal, such as, horsehide, pigskin, cowhide and the like.

The additives disclosed in U.S. Patent 2,868,750 (Gilkey) which minimize the color change in the titanate-containing water repellents can be employed in conjunction with the titanate-containing white water repellents of this invention. These additives are nitrogen-containing compounds, including nitroalkanes, such as nitromethane, nitroethane, nitropropane and nitrobenzene. These additives are added in amounts of more than .0002 mol per ounce of the white water repellent solution. These additives can be merely admixed with the other ingredients. It should be pointed out that it is not essential that this additive be included with the compositions of this invention. However, the color stability of the titanate-containing compositions of this invention is improved by these additives.

The leather samples were tested in a leather testing machine. This machine is similar in operation to the machine pictured and described on pages 401–2 of the August 1947 issue of the "Journal of the American Leather Chemists Association." The machine used has a specimen holder composed of two vertical clamps. Each clamp has one fixed and one movable arm. One of the clamps is mounted on a horizontal reciprocating shaft, which is driven by an eccentric so that the shaft moves toward and away from the fixed shaft. The leather sample is folded and a gasket placed in each end so as to form a trough. Lead shot is placed in the trough of the sample. Each end of the sample is placed between the two arms of a clamp and the clamp tightened. The trough portion of the sample is suspended in water and the reciprocating shaft ran at 60 flexes per minute. The sample is flexed by the reciprocating shaft. The number of cycles for leather to wet through is determined by an electric counter. This is accomplished by having an electrode inside the sample and one outside the sample. The water penetration is detected by a current leakage from the inside electrode through the specimen to the outside electrode. A salt is added to the water so that it will conduct electric current. The electric counter is electrically stopped when the water initially penetrates the sample and thus completes an electric circuit between the two electrodes. The number of cycles required for this to occur is the measure of water repellency.

The following example is illustrative only and should not be construed as limiting the invention which is properly delineated in the appended claims.

EXAMPLE 1

Samples of leather were coated with the compositions set forth in the following table. After the coating had dried, the water repellency of the leather was determined by the number of flexing cycles for the leather to wet through in accordance with the procedure set forth above. The amount of gloss was determined visually after polishing the leather with a cloth. The amount of chalk was determined by observing the chalk picked up on the finger after rubbing the sample. The amount of impregnation (expressed as a percent pickup) based on the weight of the leather, was determined by the difference in weight.

The coating composition was composed of a water repellent composition, an organic resin, titanium dioxide and a solvent. The compositions tabulated in the following table were made by mixing these four components in the weight percentages shown in the table. Two different water repellent compositions were used as follows. The percentages used in these compositions are expressed as weight percents.

(A) 33⅓ percent of a methylpolysiloxane copolymer composed of $(CH_3)_3SiO$ units and $SiO_2$ units having a $CH_3$ to Si ratio of 1.2:1; 33⅓ percent of a methylpolysiloxane composed of 97 mol percent $(CH_3)_2SiO$ units and 3 mol percent $(CH_3)SiO_{.5}$ unit; 33⅓ percent tetra-2-ethylhexyl titanate.

(B) 17 percent of a methylpolysiloxane copolymer composed of $(CH_3)_3SiO$ units and $SiO_2$ units having a $CH_3$ to Si ratio of 1.2:1; 33 percent of a hydroxyl endblocked dimethylsiloxane having a hydroxyl content of between 3 and 5 percent by height; 33 percent of tetra-2-ethylhexyl titanate.

Two different organic resins were used in this coating composition as follows:

(C) A resinous copolymer of 50 mol percent n-butyl methacrylate and 50 mol percent isobutyl methacrylate.
(D) A n-butyl methacylate of intermediate hardness.

The following solvents were also used:

(E) Toluene
(F) Perchloroethylene
(G) Varsol, which is a commercial solvent having an aliphatic content of about 84 percent and an aromatic content of about 16 percent.

The coating composition was prepared by mixing one of the water repellent compositions (A or B), one of the above resins (C or D), $TiO_2$ and one of the above solvents (E, F or G). These mixtures were mechanically agitated and then run through a colloid mill and then applied to the leather sample with a dauber. The concentration of each of the ingredients is set forth in the following table in percent by weight.

The A.C. Lawrence Kenna leather is a chromium-tanned, vegetable retanned, fat-liquored, buffed, side upper leather. The Eagle-Ottawa Michimoc leather is a chromium and zirconium tanned, solvent fat-liquored, full grained, side upper leather. The Eagle-Ottawa Michimoc natural leather is chromium tanned, fat-liquored, buffed, side upper leather.

That which is claimed is:
1. A composition of matter consisting essentially of
(1) 100 parts by weight of a mixture of
   (A) 15 to 50 percent by weight, based upon the weight of (1), of a compound selected from the group consisting of compounds of the general formula $M(OR)_4$ and aliphatic hydrocarbon soluble partial hydrolyzates thereof, in said compound M being selected from the group consisting of titanium and zirconium atoms and R being selected from the group consisting of aliphatic hydrocarbon radicals of less than 13 carbon atoms and hydroxylated aliphatic hydrocarbon radicals of less than 13 carbon atoms and containing less than 4 hydroxyl groups,
   (B) 5 to 70 percent by weight, based upon the weight of (1), of a methylpolysiloxane copolymer composed essentially of trimethylsiloxane units and $SiO_2$ units, said units being in such proportion that the ratio of methyl radicals to silicon atoms is from 1:1 to 2.3:1; and
   (C) 15 to 80 percent by weight, based upon the weight of (1), of a polysiloxane having the general formula $$R'_n SiO_{\frac{4-n}{2}}$$

wherein R' is selected from the group consisting of alkyl and alkenyl radicals of less than 6 carbon atoms and monocyclic aryl radicals and n has an average value of from 2 to 2.9 inclusive, each silicon atom in said polysiloxane (C) having at least one of the defined hydrocarbon radicals attached thereto,
(2) 15 to 60 parts by weight of a resin selected from the group consisting of alkyl methacrylate polymers in which the alkyl radical has from 1 to 18 carbon atoms, there being no more than 30 mol percent of alkyl radicals of less than 3 carbon atoms and alkyl acrylic polymers in which the alkyl radical has from 2 to 15 inclusive carbon atoms and
(3) 70 to 160 parts by weight $TiO_2$,
there being from 2 to 4 parts of (3) per one part of (2).

2. An article of manufacture comprising leather impregnated with from 2 to 20 percent by weight based on the weight of the leather of the composition of claim 1.

3. A composition of matter consisting essentially of
(1) 100 parts by weight of a mixture of
   (A) 15 to 50 percent by weight, based upon the weight of (1), of a compound of the general formula $Ti(OR)_4$, wherein R is an aliphatic hydrocarbon radical of less than 13 carbon atoms,
   (B) 5 to 70 percent by weight, based upon the weight of (1), of a methylpolysiloxane composed essentially of trimethylsiloxane units and $SiO_2$ units, said units being in such proportion that the ratio of methyl radicals to silicon atoms is from 1:1 to 1.5:1 and
   (C) 15 to 80 percent by weight, based upon the

TABLE I

*Composition of mixture in percent by weight*

| Mixture No. | Type of Leather | Water Repellent | Resin | Solvent | $TiO_2$, Percent | Average Percent Pickup by Wt. | Average No. of Flexes, First Drop | Appearance | |
|---|---|---|---|---|---|---|---|---|---|
| | | | | | | | | Gloss | Chalk |
| 1 | Eagle-Ottawa-Michimoc | 10% A | 4% D | 71% F | 15 | 6.4–7.7 | 9,856–18,841 | Fair | Slight. |
| 2 | A.C. Lawrence-Kenna | 10% A | 4% D | 71% F | 15 | 13.4–13.6 | 5,762–4,293 | Good | Do. |
| 3 | A white finished calf skin abraided leather. | 15% A | 4% D | 66% E | 15 | 3.56 | 40 | do | Do. |
| 4 | do | 20% A | 4% D | 61% E | 15 | 3.55 | 40 | do | Do. |
| 5 | Eagle-Ottawa Natural | 15% A | 4% C | 66% E | 15 | 7.3 | 3,391 | do | Do. |
| 6 | Eagle-Ottawa-Michimoc | 15% A | 4% C | 66% E | 15 | 3.2 | 10,000+ | do | Do. |
| 7 | do | 15% B | 4% D | 66% G | 15 | 5.7 | 14,473 | do | Do. | weight of (1), of a polysiloxane of the formula $$(CH_3)_n SiO_{\frac{4-n}{2}}$$

wherein $n$ has an average value of from 2 to 2.9 inclusive, each silicon atom in said polysiloxane (C) having at least one methyl radical attached thereto, (2) 15 to 60 parts by weight, based upon the weight of (1), of an alkyl methacrylate polymer in which the alkyl radical has from 1 to 18 inclusive carbon atoms with no more than 30 mol percent of the alkyl radicals having less than 3 carbon atoms, (3) 70 to 160 parts by weight, based upon the weight of (1), of $TiO_2$, there being from 2 to 4 parts of (3) per one part of (2).

4. An article of manufacture comprising leather impregnated with from 2 to 20 percent by weight based on the weight of the leather of the composition of claim 3.

5. A composition of matter consisting essentially of
(1) 100 parts by weight of a mixture of
  (A) 15 to 50 percent by weight, based upon the weight of (1), of tetra-2-ethylhexyl titanate,
  (B) 5 to 70 percent by weight based on the weight of (1), of a methylpolysiloxane composed essentially of trimethylsiloxane units and $SiO_2$ units, said units being in such proportion that the ratio of methyl radicals to silicon atoms is from 1:1 to 1.5:1,
  (C) 15 to 80 percent by weight, based upon the weight of (1), of a polysiloxane of the formula $$(CH_3)_n SiO$$

wherein $n$ has an average value of from 2 to 2.2 inclusive, each silicon atom in said polysiloxane (C) having at least one methyl radical attached thereto, (2) 20 to 35 parts of an alkyl methacrylate copolymer in which at least 40 mol percent of the alkyl radicals are butyl and any remaining alkyl radicals are isobutyl, (3) 90 to 110 parts of $TiO_2$, there being from 2 to 4 parts of (3) per one part of (2).

6. An article of manufacture comprising leather impregnated with from 2 to 20 percent by weight based on the weight of the leather of the composition of claim 5.

References Cited by the Examiner

UNITED STATES PATENTS

| | | | |
|---|---|---|---|
| 2,850,473 | 9/58 | Lewis et al. | 260—45.5 |
| 2,868,750 | 1/59 | Gilkey | 260—29.1 |

MORRIS LIEBMAN, *Primary Examiner.*

UNITED STATES PATENT OFFICE
CERTIFICATE OF CORRECTION

Patent No. 3,215,664                          November 2, 1965

Murrel A. Brown

It is hereby certified that error appears in the above numbered patent requiring correction and that the said Letters Patent should read as corrected below.

Column 5, line 30, for "height" read -- weight --; column 7, line 26, for "SIO$_2$" read -- SiO$_2$ --; column 8, line 5, the formula should appear as shown below instead of as in the patent:

$$(CH_3)_n SiO_{\frac{4-n}{2}}$$

Signed and sealed this 25th day of October 1966.

(SEAL)
Attest:

ERNEST W. SWIDER                                    EDWARD J. BRENNER
Attesting Officer                                           Commissioner of Patents